United States Patent [19]
Stanley et al.

[11] Patent Number: 5,731,368
[45] Date of Patent: Mar. 24, 1998

[54] AQUEOUS VINYL POLYMER DISPERSIONS

[75] Inventors: James Preston Stanley, Bound Brook; Eric Jay Nagel, Somerville, both of N.J.; Richard Jude Burns, Easton, Pa.; Walter Paul Mayer, Lebanon; Steven Nicholas Semerak, New Brunswick, both of N.J.

[73] Assignee: Union Carbide Chemicals & Plastics Technology Corporation, Danbury, Conn.

[21] Appl. No.: 522,611

[22] Filed: Sep. 1, 1995

[51] Int. Cl.$^6$ .................................................. C08J 3/00
[52] U.S. Cl. .................. 523/340; 523/339; 524/364; 524/379; 524/558; 524/458; 524/460; 524/767; 524/770
[58] Field of Search ........................ 524/832, 558, 524/457, 308, 364, 379, 458, 460, 767, 770; 523/339, 340

[56] References Cited

U.S. PATENT DOCUMENTS

| | | | |
|---|---|---|---|
| 3,017,396 | 1/1962 | Arond et al. | 260/78.5 |
| 3,260,705 | 7/1966 | Slocombe et al. | 260/78.5 |
| 3,370,031 | 2/1968 | Grommers et al. | 524/832 X |
| 3,657,174 | 4/1972 | Glabisch et al. | 260/301 |
| 3,689,532 | 9/1972 | Emmons et al. | 524/832 X |
| 4,093,575 | 6/1978 | Hagan | 526/320 X |
| 4,141,870 | 2/1979 | Burns | 428/460 X |
| 4,273,888 | 6/1981 | Graetz | 525/31 |
| 4,322,328 | 3/1982 | Graetz et al. | 524/458 |
| 4,477,623 | 10/1984 | Pons et al. | 524/832 X |
| 4,511,682 | 4/1985 | Mayer et al. | 523/402 |
| 4,970,127 | 11/1990 | Smith et al. | 428/694 |
| 4,985,314 | 1/1991 | Merriam et al. | 428/694 |
| 5,086,142 | 2/1992 | Fock et al. | 526/318 |
| 5,385,971 | 1/1995 | Sauer et al. | 524/460 X |
| 5,516,836 | 5/1996 | Sauer et al. | 524/558 |
| 5,530,056 | 6/1996 | Farwaha et al. | 524/558 |

FOREIGN PATENT DOCUMENTS

| | | |
|---|---|---|
| 248612 | 6/1987 | European Pat. Off. . |
| 565825 | 2/1993 | European Pat. Off. . |

*Primary Examiner*—Judy M. Reddick
*Attorney, Agent, or Firm*—W. K. Volles

[57] ABSTRACT

Aqueous dispersions of vinyl polymers are disclosed. The polymers are copolymers of a vinyl halide, a vinyl ester, e.g., vinyl acetate, and a poly(alkylene glycol)-based macromonomer, e.g., poly(ethylene glycol)-maleic anhydride. Also disclosed are processes for the preparation of the aqueous dispersions which comprise forming the copolymer by solution polymerization, converting the dissolved polymer into an aqueous dispersion and removing the solvent from the aqueous dispersion.

6 Claims, No Drawings

AQUEOUS VINYL POLYMER DISPERSIONS

FIELD OF THE INVENTION

The present invention relates to aqueous dispersions of vinyl polymers. More specifically, the present invention relates to aqueous dispersions of a copolymer of a vinyl halide, a vinyl ester and a poly(alkylene glycol)-based macromonomer and processes for producing the aqueous dispersions.

BACKGROUND OF THE INVENTION

Environmental concerns over the use of volatile organic compounds ("VOC's") have promoted an interest in the use of water-borne polymers as a means to apply coating compositions to substrates for a variety of purposes, such as, for example, as protective coatings on metal beverage containers and wooden furniture and as inks for printing on paper and other materials. Water-borne polymers are often made in the form of dispersions by emulsion polymerization. However, emulsion polymerization techniques often require the use of additives, such as, for example, chain transfer agents, in order to control properties of the resulting polymer, e.g., inherent viscosity. While these additives are typically effective to control the particular properties of the polymer they are intended to control, they can have adverse effects on the resulting coatings or films applied from the aqueous dispersions containing such polymers, e.g., uneven or blotchy surfaces, poor color or offensive odor. If additives such as, for example, chain transfer agents, are not employed in the emulsion polymerization, the resulting polymer may have characteristics which are undesirable, e.g., an inherent viscosity which is higher than that desired for many coating applications.

Accordingly, new polymer compositions deliverable from an aqueous medium are desired which have desirable characteristics, e.g., a relatively low inherent viscosity, without the need for utilizing undesirable additives in the polymerization process.

SUMMARY OF THE INVENTION

By the present invention it is now possible to provide polymer compositions which can be delivered from aqueous mediums and which have desirable characteristics, e.g., an inherent viscosity low enough to provide coatings having desirable properties. In accordance with the present invention, aqueous polymer dispersions are provided which contain a copolymer of a vinyl halide, a vinyl ester and a macromonomer which comprises the reaction product of a poly(alkylene glycol) and a carboxylic acid or anhydride, such as, for example, maleic acid or maleic anhydride.

The present invention also provides processes for manufacturing the polymer dispersions which comprise conducting a solution polymerization of the copolymer in a solvent, adding water to the reaction product mixture to create a dispersion of the copolymer, and removing the solvent in order to provide an aqueous dispersion comprising the copolymer.

DETAILED DESCRIPTION OF THE INVENTION

The vinyl halide monomers suitable for use in accordance with the present invention include vinyl chloride, vinyl bromide and vinyl fluoride, with vinyl chloride being preferred. Such vinyl halide monomers are commercially available. The amount of vinyl halide monomers used in the copolymers of the present invention is typically from about 50 to 90 weight percent, preferably from about 55 to 80 weight percent and more preferably from about 60 to 75 weight percent, based on the total weight of the monomers in the copolymer. As used herein, the term "copolymer" means a polymer made from two or more monomers.

The vinyl ester monomer suitable for use in accordance with the present invention include those having from 2 to about 16 carbon atoms in the ester group. Suitable vinyl ester monomers include, for example, vinyl acetate, vinyl propionate, vinyl butyrates, vinyl pentanoates, vinyl neopentanoate, vinyl hexanoates, vinyl octanoates, vinyl 2-ethylhexanoate, vinyl nonanoates, vinyl decanoates, vinyl neoanoates, vinyl neododecanoate, and the like. Preferred vinyl esters are vinyl acetate and vinyl propionate, and the most preferred vinyl ester is vinyl acetate. The vinyl esters suitable for use in accordance with the present invention, are commercially available. The amount of vinyl ester monomer in the copolymers of the present invention is typically from about 2 to 25 weight percent, preferably from about 3 to 15 weight percent, and more preferably from about 5 to 12 weight percent, based on the total weight of the monomers in the copolymer.

The macromonomers suitable for use in accordance with the present invention comprise a reaction product of a poly(alkylene glycol) and an unsaturated carboxylic acid or anhydride. Preferably, the acid is selected from the group consisting of maleic acid, fumaric acid, itaconic acid, or anhydrides or half-esters thereof.

The poly(alkylene glycol)s are preferably those that contain from about 60 mole % to 100 mole % ethylene oxide units and one or more hydroxyl groups. The remainder, zero to 40 mole % by weight of the alkylene oxide units are preferably propylene oxide units. The poly(alkylene glycols) can be homopolymers of ethylene oxide or random, block, or other copolymers of ethylene oxide with other alkylene oxides, preferably propylene oxide. Typically, the poly (alkylene glycols) suitable for use in making the macromonomers of the present invention have a number average molecular weight of from about 2,000 to 30,000 grams/gmole, preferably from about 2000 to 10,000 grams/gmole, and more preferably from about 3000 to 8000 grams/gmole. Techniques for measuring the number average molecular weight of the poly(alkylene glycols) are known to those skilled in the art. One such technique is by measuring the hydroxyl number, such as, for example and calculating the number average molecular weight therefrom such as described in the Union Carbide Publication, CARBOWAX® Polyethylene Glycols, page 42, Test Methods for Specifications (1986). Further details concerning such techniques are known to those skilled in the art.

The poly(alkylene glycols) suitable for use in accordance with the present invention are commercially available. Illustrative of such poly(alkylene glycols) are the CARBOWAX® poly(ethylene glycols) and methoxypoly(ethylene glycols) available from Union Carbide Corporation, Danbury, Conn.; poly(ethylene glycols) that have both pendant and terminal hydroxyl groups; the PLURONIC® ethylene oxide/propylene oxide/ethylene oxide ABA block copolymers available from BASF Corporation, Parsippany, N.J.; propylene oxide/ethylene oxide AB or $(AB)_n$ block copolymers; monohydroxyl-functional ethylene oxide/ propylene oxide AB and ABA block copolymers: random copolymers of ethylene oxide and propylene oxide; block and random copolymers of ethylene oxide and propylene oxide that have a hydroxyl functionality greater than 2, and the like. Poly(ethylene glycols) and methoxypoly(ethylene glycols) are preferred for use in accordance with the present invention.

The macromonomers are preferably prepared by reacting the unsaturated carboxylic acid, or anhydride or half ester, with the poly(alkylene glycol) at temperatures of about 60° C. to about 200° C., preferably from about 90° C. to 150° C., for about 1 to about 24 hours, and preferably from 1 to 10 hours at about ambient pressure conditions. It is understood by those skilled in the art that higher temperatures are often used when esterification is used to prepare the compounds from a carboxylic acid-containing compound and that lower temperatures are often used to prepare the compounds from anhydrides.

Preferably, the macromonomers are prepared using an excess of the acid, or anhydride or half ester, as compared to the poly(alkylene glycol). Preferably, the mole ratio of acid or anhydride to poly(alkylene glycol) is from greater than 1 to about 3, more preferably from about 1.2 to 2.7 and most preferably, from about 1.25 to 2.5 moles per mole. Further details concerning the preparation of the macromonomers suitable for use in accordance with the present invention are known to those skilled in the art.

The amount of macromonomer employed in the copolymers of the present invention is typically from about 5 to 30 weight percent, preferably from about 8 to 25 weight percent and most preferably from about 10 to 20 weight percent, based on the total weight of the monomers in the copolymer.

The copolymers of the present invention may comprise other monomers in addition to the monomers described above. Such additional monomers include, for example, other vinyl monomers having from 2 to 10 carbon atoms per molecule, acrylates or methacrylates having from 3 to 20 carbon atom per molecule, acrylonitriles, methacrylonitriles, and the like.

Illustrative of the other vinyl monomers include, for example, maleic anhydride, maleic acid, fumaric acid, itaconic acid and itaconic anhydride, and maleate, fumarate and itaconate diesters and half esters, vinyl ethers such as methyl vinyl ether, ethyl vinyl ether, propyl vinyl ethers, vinyl alcohol that is formed from the hydrolysis of vinyl esters such as vinyl acetate, and the like. Preferred optional vinyl monomers are maleic acid and maleic anhydride.

Illustrative of the acrylates and methacrylates are acrylic acid, methacrylic acid, the esters of acrylic and methacrylic acid such as, for example, methyl, ethyl, propyl, butyl, pentyl, hexyl, octyl, decyl, dodecyl, and the like, e.g., bornyl, isobornyl and isonorbornyl acrylate; 3-hydroxy-1-isopropyl-2,2-dimethylpropyl-(meth)acrylate, 3-hydroxy-2,2,4-trimethylpentyl (meth)acrylate, dicyclopentenylacryate; hydroxyethyl acrylate, hydroxyethyl methacrylates, hydroxypropyl acrylate, hydroxypropyl methacrylates, hydroxyhexyl acrylates, hydroxydecyl acrylates; caprolactone acrylates, cyclohexyl acrylate, 2-phenoxyethyl acrylate, glycidyl acrylate, glycidyl methacrylate, and the like. Preferred acrylates are hydroxypropyl acrylate and glycidyl methacrylate.

Especially preferred additional monomers include one or more selected from the group consisting of hydroxyethyl acrylate, hydroxy-propyl acrylate, glycidyl methacrylate, and maleic acid.

One especially preferred copolymer suitable for use in accordance with the present invention is a copolymer of vinyl chloride, vinyl acetate, hydroxypropyl acrylate and a macromonomer comprising the reaction product of a poly (ethylene glycol) and maleic anhydride. Another especially preferred copolymer is a copolymer of vinyl chloride, vinyl acetate, glycidyl methacrylate, maleic add and a macromonomer comprising the reaction product of a poly (ethylene glycol) and maleic anhydride. Yet another especially preferred copolymer is a copolymer of vinyl chloride, vinyl acetate, maleic acid and a macromonomer comprising the reaction product of a poly(ethylene glycol) and maleic anhydride. Still another especially preferred copolymer is a copolymer of vinyl chloride, vinyl acetate and a macromonomer comprising the reaction product of a poly (ethylene glycol) and maleic anhydride.

The amount of the additional monomers, when employed in the copolymers of the present invention, is typically from about 0.5 to 30 weight percent and preferably from about 1 to 20 weight percent, based on the total weight of the monomers and the copolymer. Further details concerning the selection, preparation, availability and amounts of the additional monomers are known to those skilled in the art.

The aqueous dispersions of the present invention are preferably prepared by a process which comprises solution polymerization, an optional dilution, followed by the addition of water to form a dispersion, and stripping operations.

The polymerization of the copolymer can be carried out, for example, by batch solution polymerization or by continuous solution polymerization. In each method, a solvent is employed in order to conduct a polymerization in a solution phase. Preferably, the solvent has solvency for, i.e., can dissolve, the monomers and the copolymer product. Preferably, the solvent is water miscible. The solvents for the solution polymerization also preferably have a low boiling point to minimize thermal decomposition of products during removal and act as chain transfer agents. Illustrative solvents include ketones, hydrocarbons, esters, and the like. Preferred solvents are acetone, methylethyl ketone, mixtures of ketones and lower alcohols and the like. Acetone is an especially preferred solvent for use in accordance with the present invention. Typically, the amount of solvent used in the polymerization is from about 20 to 80 weight percent and preferably from about 30 to 70 weight percent, based upon the total weight of the solvent and the monomers.

The initiators suitable for conducting the solution polymerization include any initiators capable of generating free radicals in the monomers. Illustrative of such initiators are isopropylperoxydicarbonate, and other peroxydicarbonates, acetyl peroxide and other diacyl peroxides, t-butylperoxy acetate and other peresters, dicumyl peroxide and other dialkyl peroxides, azobisisobutyronitrile and other diazo compounds, and the like.

In addition to the initiator described above, other ingredients, known to those skilled in the art of solution polymerization can be added. Preferably, however, the polymerization is conducted with a substantial absence, i.e., preferably less than 5 weight percent and more preferably less than 1 weight percent, of additives which can have a deleterious effect on coatings made from the copolymers of the present invention. Such deleterious ingredients, include, for example, chain transfer agents and surfactants.

Typically, batch solution polymerization is carried out in a stirred tank type reactor with inlet and outlet ports, a means for heating and cooling and associated instrumentation known to those skilled in the art of such polymerizations.

A preferred semi-batch polymerization process is as follows. An initial reactor charge containing a portion of the monomers and the solvent is prepared and added to the reactor. The reactor is then heated to the desired reaction temperature, preferably from 50° to 70° C. Then, the remaining monomers, including the macromonomer, and the initiator are fed to the reactor continuously or in portions, preferably at least 8 portions, over time, preferably from about 1 hour to 8 hours. When all of the monomers and initiator has been fed, the mixture is maintained at the reaction temperature to complete the reaction, e.g., up to 4 hours. When the reaction is complete, the reactor is purged to remove residual unreacted monomers. If desired, additional solvent may be added in order to dilute the polymer solution.

Typically, continuous solution polymerization is carried out in a jacketed, continuous stirred tank reactor, closed loop reactor, or tubular reactor with inlet and outlet ports, a means of heating and cooling, feed tanks and associated instrumentation known to those skilled in the art of such polymerizations.

A preferred continuous solution polymerization process, using a continuous stirred tank reactor, is as follows. Monomers, solvent and initiator are fed to the reactor initially as in a semi-batch polymerization and the temperature raised to the desired reaction temperature, typically from 40° to 80° C., preferably from 50° to 70° C. Monomers, solvent and initiator are then fed continuously, either separately or mixed together, and the product is drawn off continuously at an equal rate so as to maintain a constant level in the reactor. The initiator feed rate is adjusted in order to maintain the copolymer solids at the desired production rate. The product stream is then passed to a distillation apparatus where the excess unreacted monomers are distilled overhead.

Further details concerning the solution polymerization processes suitable for making the copolymers of the present invention are known to those skilled in the art.

Upon completion of the polymerization, by either batch or continuous methods, of the monomers to form the copolymers of the present invention, and removal of unreacted monomers, the copolymers dissolved in the solvent are then contacted with an effective amount of water to form an aqueous-organic liquid medium comprising a dispersion of the copolymer. This technique is sometimes referred to in the art as "letdown".

The copolymer solution can be letdown to form an aqueous copolymer dispersion, for example, by a batch or a continuous process.

In a preferred batch letdown process, the copolymer solution at preferably ambient conditions, but typically not more than 50° C., is charged to equipment preferably comprising of a baffled, cylindrical, glass or stainless steel vessel with high shear mixing capability. High shear mixing conditions are important to forming the dispersion of the copolymer. The mixers can be in-tank or in-line type mixers. Illustrative of the mixers that can be used are Waring Blenders, and Premier mixers. The mixer is started and set to the desired high shear rate. Water, preferably deionized water, is added in such a manner that it is quickly pulled down and drawn into the mixing copolymer solution. The effective amount of water added to create the dispersion is preferably from about 0.2 to about 1 and more preferably from about 0.3 to about 0.6 times the volume of the copolymer solution. The rate of water addition is such that the total quantity used is added over about 30 seconds to about 10 minutes, preferably from about 1 to about 3 minutes. After the water addition, the shear mixing is preferably continued for a short period of time, for example, from about 30 seconds to about 5 minutes, preferably from about 1 to about 3 minutes. The letdown product is obtained as aqueous-organic liquid medium containing the copolymer dispersion.

In a preferred continuous letdown process, a vessel is employed which contains a high shear mixing head, two inlet tubes, each tube terminating inside the vessel near the mixing head, an outlet port and associated tubing or piping for continuous removal of product, feed tanks, and instrumentation known to those skilled in the art. Baffles may also be employed. To operate the system, the one feed tank is filled with the polymer solution, and the other feed tank is filled with water, preferably deionized water, each at preferably ambient temperature and typically below 50° C. temperature. Continuous operation is initiated by simultaneously pumping the copolymer solution and water in the desired ratio. As water and polymer solution enter the vessel bottom and inpinge in the mixing head area, an aqueous organic liquid medium containing the copolymer dispersion is simultaneously removed from the vessel. The ratio of water to copolymer solution fed to the letdown vessel is dependent on the copolymer concentration in the solution, but is within the range described with reference to the bulk process.

Preferably, the letdown process is conducted with the substantial absence of water-miscible bases. For purposes of this invention, the term "water-miscible base" is used in the broad sense to include any proton acceptor that will neutralize the acid functionalities of the copolymer. Exemplary bases may be both organic and inorganic, and include alkali metal or alkaline earth hydroxides, such as, sodium hydroxide, potassium hydroxide, and the like; ammonium hydroxide; organic amines including monoalkylamines, alkanolamines, aromatic amines, cyclic amines, alkylaryl amines, and the like. Typically, the amount of water-miscible base in the aqueous dispersions of the present invention after solvent removal as described below in less than about 5 wt. %, preferably less than about 2 wt. %, more preferably less than about 0.5 wt. %, based on the total weight of the aqueous dispersion.

Upon completion of the letdown process, at least a portion of the solvent is removed from the aqueous organic liquid medium in order to form an aqueous medium comprising a dispersion of the copolymer. The removal of the solvent can be conducted by any means known to those skilled in the art, preferably by distillation. Typical distillation conditions, when acetone is the solvent, include a temperature of from about 40° to 65° C. and a pressure from about 0.1 to 29 inches of mercury. After stripping, the aqueous dispersion is preferably filtered to remove debris. It is preferred that the solvent recovered from the separation step be recycled to the solution polymerization reactor. Further details concerning the removal of the solvent from the aqueous organic liquid medium are known to those skilled in the art.

The Amount of solvent remaining in the aqueous medium after removal of the solvent is typically less than about 1 weight percent, preferably less than about 0.5 weight percent and more preferably less than about 0.3 weight percent, based on the total weight of the aqueous medium. The amount of copolymer in the aqueous medium is typically from about 20 to 60 weight percent, preferably from about 30 to 50 weight percent, and more preferably from about 38 to 50 weight percent, based on the total weight of the aqueous medium. The amount of water is typically from about 40 to 80 weight percent, preferably from about 50 to 70 weight percent, and more preferably from about 50 to 62 weight percent, based on the total weight of aqueous medium. Preferably, the copolymers of the present invention and the aqueous dispersions containing such copolymers are non-ionic.

The particle size of the copolymers of the present invention is typically from about 0.03 to 1.0 microns ("$\mu$"), preferably from about 0.05 to 0.5$\mu$ and more preferably from about 0.08 to 0.4$\mu$.

Quite surprisingly, in accordance with the present invention, the copolymers have an Inherent Viscosity of less than about 0.6, preferably from about 0.2 to 0.5 and more preferably from about 0.22 to 0.4. As used herein, the term "Inherent Viscosity" means the inherent. viscosity determined using a Ubbelohde viscometer according to the ASTM D1243 procedure. Further details concerning the measurement of Inherent Viscosity are known to those skilled in the art.

Since Inherent Viscosity is directly related to molecular weight, the copolymers of the present invention also have low molecular weight. Preferably the copolymers have a molecular weight that is significantly lower than the molecular weight of similar polymers prepared by emulsion polymerization. As a result, the copolymers of the present invention can provide superior coatings on substrates as compared to the higher molecular weight emulsion polymers which often provide coatings with inferior properties especially in the areas of gloss and adhesion. Thus, the aqueous dispersions of the present invention can provide the advantages of low molecular weight polymers typically found in organic solution polymerized systems without the adverse environmental effects caused by the presence of VOC's in such solution polymerized systems.

Compositions comprising the water dispersible copolymers of the invention have a variety of end uses, in general as coating compositions and adhesives. They can be formulated into products such as, for example, coatings (both rigid and flexible), inks, sealants and adhesives in a variety of ways. For example, methods of formulation include but are not limited to: forming a film directly from the dispersion or by addition of a coalescing solvent. Further details concerning end uses, other ingredients typically contained in coating and adhesion formulations, such as, for example, surfactants, pigments, colorants, crosslinkers, e.g., phenolics, etc., are known to those skilled in the art.

The substrates to which the coatings and adhesives can be applied are not limited and include, for example, wood, metal, glass, ceramic, plastic and paper. Quite surprisingly, films made from the copolymers of the present invention can have outstanding mechanical properties in view of their low Inherent Viscosity.

The following examples are provided for illustrative purposes and are not intended to limit the scope of the claims which follow.

EXAMPLES

The following ingredients were used in the examples.
Chemical Compounds
Acrylic 1: A 46 wt. % solution of a waterborne acrylic polymer in water sold as Joncryl™ 537 by S. C. Johnson Company, Racine, Wis.
Blue Pigment 1: A pigment containing 60 wt. % of a phthaloblue pigment in water and proprietary surfactant sold as Aquatone Blue WD 1112 by Sun Chemical Company, Cincinnati, Ohio.
Catalyst 1: A 40 wt. % solution of p-toluene sulfonic acid in isopropanol and sold as CYCAT™ 4040 by the Cytec Industries, West Patterson, N.J.
Colloid 770: an antifoam sold by Colloids Inc., Div. of Rhone Poulenc, Marietta, Ga.
Latex 1: An anionic acrylic latex sold as CL-104 by Rohm & Haas, Philadelphia, Pa.
Leneta Paper: A black and white paper hiding chart that is available from The Leneta Co., Ho-Ho-Kus, N.J.
MPEG 1: A 5,000 number-average molecular weight, hydroxyl functional methoxy poly(ethylene glycol) sold by Union Carbide Corporation, Danbury, Conn. as CARBOWAX® Methoxy Polyethylene Glycol 5000.
PEG 1: A 4,600 number-average molecular weight, dihydroxyl functional poly(ethylene glycol) sold by Union Carbide Corporation, Danbury, Conn. as CARBOWAX® Polyethylene Glycol 4600.
PEG 2: An 8,000 number-average molecular weight, dihydroxyl functional poly(ethylene glycol) sold by Union Carbide Corporation, Danbury, Conn. as CARBOWAX® Polyethylene Glycol 8000.
Phenolic 1: A 60 wt. % solution of a phenolic resin in butanol sold by Georgia Pacific Resins Dedtur, Ga. as BAKELITE® BKS-7590.
Plasticizer 1: A commercial tributoxyethyl phosphate plasticizer sold as KP-140 by FMC Corp., Philadelphia, Pa.
Shoe Polish: A brown commercial shoe polish sold by The Kiwi Polish Company PTY. Ltd. North Douglassville, Pa.
Solvent 1: Ethoxybutanol sold by Union Carbide Corporation, Danbury, Conn. as Butyl CELLOSOLVE™.
Solvent 2: Propylene glycol monomethyl ether sold by ARCO Chemical Co., Philadelphia, Pa. as ARCOSOLVE™ PM.
Spray Cleaner: Commercial household product sold under the tradename "Fantastik" by Teysize, Greenville, S.C.
Urea Resin 1: A high solids (98%+) urea-formaldehyde resin sold as BEETLE™ 65 by the Cytec Industries, West Patterson, N.J.
Vinyl 1: A 40 wt. % solution of a 82/9/9 weight ratio vinyl chloride/vinyl acetate/glycidyl methacrylate copolymer in a 3 to 2 mixture of methyl ethyl ketone and toluene that is sold by Union Carbide Corp., Danbury Conn. as UCAR® Solution Vinyl Resin VERR-40.
Vinyl 2: An 81/17/2 weight ratio vinyl chloride/vinyl acetate/maleic acid copolymer sold by Union Carbide Corp., Danbury, Conn. as UCAR® Solution Vinyl Resin VMCA.
Vinyl 3: An anionic waterborne polymer sold as UCAR Waterborne Vinyl Dispersion AW-850, by Union Carbide Corporation, Danbury, Conn.
Vinyl 4: A vinyl chloride/ethylene waterborne polymer sold as Vancryl™ 610 by Air Products Co., Allentown, Pa.
Vinyl 5: An anionic waterborne vinyl polymer sold as UCAR Waterborne Vinyl Dispersion AW-875 by Union Carbide Corporation, Danbury, Conn.
Equipment
Mixer 1. A Premier Series 2000, Model 90 dispersator manufactured by Premier Mill Corp., Reading, Pa., and equipped with a 1-inch diameter Simplex mixing head.
Performance Tests
Blush Rating: Blush is a hazy appearance caused by water absorption in a polymer film on a substrate that is subjected to hot water immersion at 77° C. for 45 minutes. Rating: 10=no change; 8=borderline acceptability; <8=unacceptable appearance.
Chemical Resistance: These are spot tests wherein the chemical is spotted on the coating and allowed to maintain contact with the coating in an uncovered state for 30 minutes. After this time the chemical is removed by wiping and the coating is air dried under ambient conditions for at least ten minutes. The coating is then examined for etching, cracking, or other damage.
Impact: A force of 22 inch-pounds is applied to the back side (uncoated side) of a coated, 9.0 mil thick aluminum panel. Rating: Pass=no visible cracks; Fail=any visible cracking.
Surface Condition: Carried out by touching coating/ink with a finger. Rating of Moderate and Heavy indicate the test material clings to a finger and Dry indicates no adherence to the finger.

Sutherland Rub Test: A 50-cycle Sutherland rub or abrasion of 4 pounds with Kraft paper facing. Rating: Trace Abrasion=less than 10% of the surface marred; Moderate Abrasion=about 50% of the surface was marred; Heavy Abrasion=100% of the surface was marred.

Wet Adhesion: A coated panel is removed from the hot water, blush bath and within 20 seconds it is wiped dry, crosshatched with a cutting device, and tested for adhesion by pressing Scotch tape #610 to the film and then rapidly pulling the tape free. Rating: 100=no coating removed; 95=5% of coating removed; 80=20% of coating removed, etc., to 0=coating completely removed. If rating number appears in parentheses, they are indicative of the rating after the panel has dried under ambient conditions for 20 minutes.

Bell Adhesion Test: A tool described as an organic coating adhesion tester made by United States Testing Company, Inc., Hoboken, N.J., is pressed firmly against the coated surface and pulled with a slow, steady motion, producing linear indentations in the surface. The coating should conform to the contour of the indentation without cracking, chipping, or separating.

Example 1

The following describes preparation of PEGMERs A through G, wherein the term "PEGMER" is an abbreviation for poly(ethylene glycol) maleates or methoxypoly(ethylene glycol) maleates. The following amounts of poly(ethylene glycol), ("PEG"), or methoxypoly(ethylene glycol), ("MPEG"), and maleic anhydride were placed in a 1 liter ("L") glass reactor (2L for PEGMER G) equipped with a stirrer, temperature sensing device, inlet/exit ports, and nitrogen purge, were heated to the indicated temperatures, and were held at these temperatures for the indicated times set forth in Table 1.

TABLE 1

| PEGMER | TYPE PEG or MPEG Used | Amt. PEG or MPEG used, grams | Maleic Anhydride, grams | Reaction Temp., °C. | Reaction Time, hours | Water Added grams |
| --- | --- | --- | --- | --- | --- | --- |
| A | PEG 1 | 600 | 15.98 | 120 | 8 | 60 |
| B | PEG 2 | 600 | 9.19 | 120 | 8 | 60 |
| C | PEG 2 | 600 | 14.7 | 120 | 8 | 60 |
| D | PEG 2 | 600 | 18.38 | 120/100 | 2/5 | 60 |
| E | PEG 1 | 400 | 17.04 | 120/100 | 2/5 | 40 |
| F | MPEG 1 | 400 | 11.76 | 120/100 | 2/5 | 40 |
| G | PEG 2 | 800 | 24.53 | 120 | 8 | 80 |

The mixtures were stirred throughout the reaction periods. In those instances where two temperatures and times are indicted, the reaction mass was first heated to 120° C. and held there for 2 hours and then the temperature was lowered to 100° C. and held at this temperature for 5 hours. At the end of the reaction time given in Table 1, cooling was begun and an amount of water equal to the 10% of initial weight of the poly(ethylene glycol) was added to the reaction mass. The preparations were then cooled to below 65° C. and sufficient acetone was added to make a 33.3% solution of the PEGMER. The cooled solutions were stored at room temperature for further use.

In the case of PEGMER G, after the 8 hour reaction time, the reaction mass was cooled to 80° C. before the water was added. The temperature was then decreased to 65° C. and 782.65 grams ("g") acetone was added with stirring. The mixture was stirred for 5 minutes with additional cooling and then poured into a one-gallon glass container. An additional 782.65 g of acetone was used to rinse the reactor and the rinse acetone was added to the same glass container. The preparations of PEGMERs described in Table 1 were repeated as needed to obtain the quantities of product needed in the following examples.

Comparative Example A

This example illustrates that an aqueous emulsion procedure such as that described, for example, in Example 1 of EP 565,825-A1 does not produce an acceptable waterborne coating when used to make the preferred copolymers of this invention. Vinyl chloride is markedly more hydrophobic than most of the vinyl or acrylate monomers used in the cited publication and therefore does not form easily polymerized micelles in water. Furthermore, the vinyl chloride-based polymers are more dense in nature and therefore more difficult to stabilize in a dispersion than most acrylate-based polymers.

Eighty parts of water, 0.8 part of t-butyl hydroperoxide, and 5 parts of a macromonomer such as described in Example 1 above were placed in a polymerization reactor as hereinafter described in Example 2 and the mixture heated to 70° C. A mixture of 74 parts vinyl chloride, 10 parts vinyl acetate, and 16 parts hydroxypropyl acrylate was added to the reactor over a three-hour period. In addition, a mixture of 0.6 part sodium formaldehydesulfoxylate in 30 parts of water was added over a period of 4 hours. The reaction mixture was maintained at 70° C. for an additional 2 hours after which the reactor was cooled to room temperature and the unreacted vinyl chloride was purged from the reactor. The resulting mixture contained 18% by weight solids and was a very unstable dispersion and agitation was required to maintain the system in an emulsified form. When agitation was stopped, the particles settled to the bottom of the container within minutes. The mixture did not form a continuous film when spread on a glass substrate surface, and had no adherance to the surface.

Example 2

This example demonstrates preparation of a copolymer in a semi-batch reaction. A Feeding Charge 1 was prepared by blending 97.5 g vinyl chloride, 13.5 g vinyl acetate, and 21 g hydroxypropyl acrylate. A Feeding Charge 2 was prepared by blending 50 g of the acetone solution of PEGMER A and 14 g of a 10 wt. % solution of isopropylperoxy dicarbonate in acetone.

A 1L stainless steel autoclave equipped with a means of heating and cooling and various entry and exit ports was evacuated and charged at room temperature with an Initial Charge mixture containing 300 g of acetone, 95 g vinyl chloride, 28 g vinyl acetate, 2 g of hydroxypropyl acrylate, and 4 g of the acetone solution of PEGMER A. The temperature was then increased to 58° C. When temperature was reached, one tenth of Feeding Charge 1 and one tenth of Feeding Charge 2 were added to reactor. After 15 minutes second one-tenth portions of Feeding Charge 1 and Feeding Charge 2 were added to the reactor. This feeding procedure was continued every 15 minutes until all of each Feeding Charges 1 and 2 were added over a total time of 2.5 hours. After this time, the reaction mixture was maintained at 58° C. for 40 minutes and then cooled to room temperature. The excess vinyl chloride was then purged from the reactor and the acetone solution of the reaction mass was discharged and stored prior to conversion to a waterborne dispersion. The total amount of copolymer produced was about 150 g.

A portion of the acetone solution of the reaction mass was converted into a waterborne dispersion in the following manner. An amount of the acetone solution containing 44 g of copolymer was placed in a blender and 83 g of water were added with vigorous stirring over a period of 15 to 60 seconds. The stirring was then continued for an additional 60 seconds. The mixture was then placed in a rotary evaporator and the acetone was stripped off under vacuum at a temperature of less than 60° C. The resulting stable, milky waterborne vinyl dispersion was between 35 and 45% solids and had a mean particle size of less than about 400 nm. and the copolymer had an Inherent Viscosity of between 0.25 to 0.33.

Examples 3 to 7

Waterborne vinyl copolymers were prepared from the following ingredients in the same manner as described in Example 2 except the ingredients and amounts used are as given in Table 2.

TABLE 2

| INGREDIENT | EXAMPLE | | | | | |
|---|---|---|---|---|---|---|
| | 2 | 3 | 4 | 5 | 6 | 7 |
| Initial Charge | | | | | | |
| Acetone, g | 300 | 300 | 290 | 260 | 290 | 300 |
| Vinyl chloride, g | 95 | 95 | 121 | 120 | 100 | 95 |
| Vinyl acetate, g | 28 | 28 | 45 | 41 | 31 | 28 |
| Hydroxypropyl acrylate, g | 2 | — | — | — | — | 2 |
| Hydroxyethyl acrylate, g | — | 2 | — | — | — | — |
| Glycidyl methacrylate, g | — | — | 0.5 | — | — | — |
| Maleic acid, g | — | — | 0.5 | 0.5 | — | — |
| PEGMER A PEG, g | 4 | 4 | 4 | — | 6 | — |
| PEGMER B PEG, g | — | — | — | — | — | — |
| PEGMER C PEG, g | — | — | — | 4 | — | — |
| PEGMER D PEG, g | — | — | — | — | — | — |
| PEGMER E PEG, g | — | — | — | — | — | — |
| PEGMER F PEG, g | — | — | — | — | — | 4 |
| Feeding Charge 1 | | | | | | |
| Vinyl chloride, g | 97.5 | 97.5 | 105 | 103 | 105 | 97.5 |
| Vinyl acetate, g | 13.5 | 13.5 | 18 | 16.5 | 15 | 13.5 |
| Hydroxypropyl acrylate | 21 | — | — | — | — | 21.0 |
| Hydroxyethyl acrylate | — | 21 | — | — | — | — |
| Glycidyl methacrylate | — | — | 4.5 | — | — | — |
| Feeding Charge 2 | | | | | | |
| PEGMER A PEG, g | 50 | 50 | 50 | — | 90 | — |
| PEGMER B PEG, g | — | — | — | — | — | — |
| PEGMER C PEG, g | — | — | — | 77 | — | — |
| PEGMER D PEG, g | — | — | — | — | — | — |
| PEGMER E PEG, g | — | — | — | — | — | — |
| PEGMER F PEG, g | — | — | — | — | — | 50 |
| Maleic acid, g | — | — | 5 | 3 | — | — |
| Isopropylperoxy dicarbonate, 10% solution in acetone, g | 14 | 14 | 19 | 15 | 18 | 14 |

Example 8 and 9

These examples describe a pilot plant preparation of the water borne vinyl polymers of this invention. The polymerizations were carried out in a 3L, jacketed, liquid-full, continuous-loop, stainless steel reactor. Two separate streams were fed into the reactor. The first stream, Monomer Feed, contained vinyl chloride, vinyl acetate, poly(ethylene glycol) maleate, acetone, and any optional reactants. The second stream, Catalyst Feed, contained the free-radical generating initiator dissolved in acetone. The amount of reactants and reaction conditions are given in Table 3. The reactor was run under continuous feed conditions until the desired polymer solids, as determined by densitometer and spot sampling/analysis for solids, were achieved. The continuous polymerization was then run holding solids constant with the product solution (varnish) collected in a stainless steel tank. The product tank was under vacuum during varnish collection to start removal of unreacted monomers and to cool the varnish to about 20° to 25° C. The varnish was stored overnight at ambient temperature before it was additionally vacuum stripped for 4 hours at 25° to 30° C. The final varnish contained 1 to 5 percent vinyl acetate, less than 0.1 percent vinyl chloride, copolymer and acetone (the percentage is dependent on final varnish solids). The polymer solutions were stored for further conversion into waterborne polymer compositions.

TABLE 3

| INGREDIENTS/CONDITIONS | EXAMPLE | |
|---|---|---|
| | 8 | 9 |
| Monomer Feed | | |
| Vinyl chloride, g | 6900 | 6400 |
| Vinyl acetate, g | 1150 | 1200 |
| PEGMER G (33% soln. in acetone), g | 1225 | 1782 |
| Hydroxypropyl acrylate, g | 560 | — |
| Glycidyl methacrylate, g | — | 190 |
| Maleic anhydride, g | — | 45 |
| Acetone, g | 7000 | 8000 |
| Deionized water, g | 450 | 50 |
| Catalyst Feed | | |
| Isopropylperoxy dicarbonate, 2.5% solution in acetone, g used/1000 g Monomer Feed | 57 | 71 |
| Monomer Feed rate, g/hour | ~2000 | ~2000 |
| Catalyst Feed rate | varied* | varied* |
| Polymer solids during reaction, wt. % | 19–21 | 14–16 |
| Reaction temperature, °C. | 62 | 60 |
| Average reactor residence time, hours | 1.3 | 1.5 |
| Total solids of stripped reaction product, wt. % | 37 | 22 |

*The initiator feed rate was adjusted to maintain polymer solids at the indicated value as determined by analysis. Total amount of initiator used is indicated in the table.

Example 10

This example describes the dilution of the polymer solution from Example 8. A stirred container as described in Example 11 below was charged with 644 grams of Example 8 polymer solution and 292 grams of acetone were added under ambient conditions. The resultant solution contained 20 wt. % copolymer and 80 wt. % acetone.

Example 11

This example demonstrates the conversion of the diluted polymer solution from Example 10 into an aqueous polymer dispersion by a continuous letdown process. A 4¾-inch diameter, 1.375-liter, stainless steel cylindrical mixing vessel equipped with three ½-inch, stationary, vertical baffles located 120° apart, inlet and exit ports for introduction of feed materials and removal of product, a Mixer 1 whose mixing head was located 1¾-inch from the vessel bottom and ⅝-inch above the feed tubing inlets, feed tanks, and tubing were used for the continuous letdowns. The inlet tubing was arranged in such a manner that feed streams entering the mixing vessel would be directed upwards toward the bottom of the mixer head. The outlet port for continuously discharging the aqueous polymer dispersion was an overflow nozzle located in the side of the vessel six inches above the vessel bottom.

One feed tank was charged with 3,524 g of Example 10 diluted polymer solution and the other with deionized water.

The process was begun by charging 1070 milliliters ("mL") of Example 10 dilute polymer solution to the mixing vessel. Then the mixer was started and set at a speed of 6000+/−100 revolutions per minute. At this point, 306 mL of deionized water were fed to the mixer at a rate of 28.6 mL per minute. This addition filled the mixing vessel. During this filling process the temperature ranged between 26° and 29° C. Continuous operation was initiated by feeding Example 10 diluted polymer solution to the filled vessel at a rate of 100 mL per minute and deionized water at a rate of 28.6 mL per minute. As these feeds entered the mixing vessel, aqueous polymer dispersion, whose temperature ranged between 29° and 30° C., was continuously discharged into a storage container. After 25 minutes of continuous operation, feeding was terminated. Mixing was continued for two minutes after feed termination. The mixing vessel was drained and the aqueous polymer dispersion was added to the storage container. A total of 4056 g of aqueous polymer dispersion were recovered.

Example 12

This example demonstrates a description of a pilot-plant, batch stripping (removal) of acetone from aqueous polymer dispersion. A 15-gallon, jacketed, stainless steel tank equipped with a stirrer and ports for charging and removing materials was charged with 17,563 g of a mixture containing 25 wt. % water, 60 wt. % acetone and 15 wt. % of a copolymer solution prepared in a manner similar to that used in the previous Examples. Six grams of Colloid 770 were added to the dispersion as an antifoam agent. Jacket temperature was set at 60° C. The mixture was agitated with an anchor agitator at 30 to 40 revolutions per minute and stripped under a vacuum of 19.5 in. Hg for 1.5 hours during which time the dispersion temperature increased from 34° to 40° C. This was followed by a second stripping operation carried out at 11 to 15 in. Hg for 4.5 hours while maintaining a slow nitrogen purge though the dispersion. The stripped dispersion was discharged through a 25-micron cartridge filter to remove derbis, and 5,845 grams of the waterborne vinyl polymer dispersion were recovered. The dispersion contained 38% total solids.

Examples 13–15

Waterborne copolymer products of the invention containing vinyl chloride/vinyl acetate/glycidyl methacrylate/maleic acid/PEGMER were prepared according to the procedures described in the previous Examples to contain the theoretical compositions indicated in Table 4.

TABLE 4

|  | Example | | |
|---|---|---|---|
|  | 13 | 14 | 15 |
| TYPE PEGMER USED | C | A | A |
| Expected Polymer Composition | | | |
| Vinyl chloride, weight percent | 65 | 72 | 70 |
| Vinyl acetate, weight percent | 8 | 12 | 12 |
| Glycidyl methacrylate, weight percent | 6 | 3 | 3 |
| Maleic acid, weight percent | 1 | 0.5 | 3 |
| PEGMER, weight percent | 20 | 12 | 12 |
| Composition of waterborne vinyl soln. | | | |
| Polymer, weight percent | 32.4 | 40 | 42.3 |

Examples 16–19 And Comparative Examples B, C, and D

These examples describe preparation of coatings for metal protection. The coatings were tested for Blush Rating, Wet Adhesion, and Impact. Those coatings that pass these tests would be suitable for beverage can end coatings, general metal coatings, and the like. The ingredients shown in Table 5 were placed in glass containers and well blended and then applied by draw-down technique with a No. 6 wire wound rod to chromium treated aluminum panels that were 9 mils thick at a coating weight of 6–8 milligrams per square inch. The coated panels were cured 3 minutes in a forced-air oven set at 204° C. The cured coatings were cooled to room temperature and tested.

TABLE 5

| | EXAMPLES | | | | | | |
|---|---|---|---|---|---|---|---|
| | Comp. Ex. B | 16 | 17 | 18 | 19 | Comp. Ex. C | Comp. Ex. D |
| INGREDIENTS | | | | | | | |
| Vinyl 1, g | 30.0 | — | — | — | — | — | — |
| Vinyl 2, g | 8.0 | — | — | — | — | — | — |
| Vinyl 3, g | — | — | — | — | — | 10.0 | 10.0 |
| Example 13 Vinyl, g | — | 10.0 | — | — | — | — | — |
| Example 14 Vinyl, g | — | — | 10.0 | — | — | — | — |
| Example 15 Vinyl, g | — | — | — | 10.0 | 10.0 | — | — |
| Cyclohexanone, g | 9.3 | — | — | — | — | — | — |
| Solvent 1, g | — | 1.1 | 1.4 | 1.5 | 1.3 | — | 0.12 |
| Water, g | — | 1.1 | 1.4 | 0.8 | 1.3 | 1.0 | 1.0 |
| Xylene, g | 9.3 | — | — | — | — | — | — |
| Phenolic 1 | — | — | — | — | 0.14 | — | 0.12 |
| TEST RESULTS | | | | | | | |
| Blush Rating | 10 | 6+ | 5 | 8+ | 9+ | 9 | 9 |
| Impact Resistance | Pass | Pass | Fail | Pass | Pass | Pass† | Pass† |
| Wet Adhesion | 100 | 95 | 100 | 80 | 100 | 0 | 40 |

†These coating had a dark brown coloration and they were unacceptable from an aesthetic standpoint.

Comparative Example B is an example of the formulation and results obtained with a conventional, commercial, solvent-based vinyl system that would be considered as high quality in nature. In comparison, the waterborne coatings from Examples 16 and 17 were deficient in Blush Rating, but Example 16 had excellent impact resistance and wet adhesion and would be useful in many metal coating end uses and although Example 17 coating had poor impact, it had excellent wet adhesion and too would be good in a variety of metal coating end uses. The waterborne coating from Example 18 had a balance of properties that make it acceptable as an alternative to the solvent-borne coating of Comparative Example B. The waterborne coating from Example 19 that contained a small amount of a phenolic resin (2 wt. % based on the waterborne vinyl polymer) had properties equivalent to the Comparative Example B coating. Comparative Examples C and D are commercial waterborne vinyl formulations without (Ex. C) and with 2% (Ex. D)phenolic resin based on the waterborne vinyl polymer and are presented to demonstrate the unexpected results of the coatings of Examples 18 and 19. The coatings of Examples 18 and 19 have surprisingly improved properties over those of Comparative Examples C and D.

Example 20

Comparative Examples E and F

These examples describe preparation of waterborne inks from a copolymer of the invention and from commercial waterborne products that are currently recognized as high quality products for preparation of waterborne inks. The following ingredients set forth in Table 6 were placed in a glass container in the order shown and well mixed by mechanical stirring to form the inks. The inks were applied either to Leneta paper card stock or to flexible vinyl substrates using a No. 6 wire-wound rod. On the paper substrate the inks were cured by air drying for a period of 24 hours under ambient conditions. The test on the vinyl substrate was conducted after air drying two days under ambient conditions. The ink of Example 20 and Comparative Example E were formulated as essentially zero VOC inks, but the ink of Comparative Example F could not be formulated as a zero VOC ink.

TABLE 6

| INGREDIENTS | EXAMPLE 20 | COMPARATIVE EXAMPLE E | COMPARATIVE EXAMPLE F |
|---|---|---|---|
| Vinyl prepared as in Ex. 2, g | 10.0 | — | — |
| Acrylic 1, g | — | 10.0 | — |
| Vinyl 4, g | — | — | 15.0 |
| Plasticizer 1, g | 0.83 | 0.7 | — |
| Blue Pigment 1, g | 4.5 | 5.0 | 7.7 |
| Solvent 1, g | — | — | 0.5 |
| Solvent 2, g | — | — | 1.9 |
| Water, g | 2.0 | 1.5 | 1.5 |
| Paper Substrate Results Chemical Resistance | | | |
| Water | No Effect | No Effect | No Effect |
| 50% "Fantastik" Cleaner | No Effect | No Effect | No Effect |
| 50% Ethanol | No Effect | No Effect | No Effect |
| Gloss, 60 degree | 84 | 77 | 76 |
| Sutherland Rub Test | Trace Abra. | Heavy Abra. | Moderate Abr. |
| Flexible Vinyl Substrate Result | | | |
| Surface Condition | Dry | Moderate Tack | Very Tacky |

The ink of Example 20 had chemical resistance equivalent to the commercial products of the Comparative Examples plus improved gloss, abrasion resistance, and surface character.

Examples 21 and 22

Comparative Examples G and H

This example demonstrates the use of the copolymers of the present invention as coatings for wood. Two aqueous waterborne copolymer dispersions were made from the ingredients set forth in Table 7 below according to the processes described in the previous Examples and compared with two commercial waterborne products. Comparative Example G was based on Vinyl 5 polymer and Comparative Example H was based on Latex 1 polymer. All coatings contained 40% by weight ethylene glycol monobutylether based on the polymer solids as a coalescing aid. The thermoplastic coatings prepared from the aqueous lacquers are suitable for use as clear coatings, or if desired pigmented coatings, for wood cabinets, fixtures, furniture, and similar end uses. For the water spot test and Bell adhesion test, three 4-mil wet films of the aqueous dispersions were cast onto oak veneer. Each wet film was baked for 20 minutes at 60° C. before the next coat was applied (total baking time was 60 minutes). After the final baking step the coated substrate was conditioned at 40° C. for five days before testing. For the spray cleaner spot test and shoe polish test, single 4-mil wet films were cast onto Leneta paper. The properties of the coatings are given in Table 7.

TABLE 7

| | Example | | Comparative Ex. | |
|---|---|---|---|---|
| | 21 | 22 | G | H |
| TYPE PEGMER USED | G | F | — | — |
| Theoretical Polymer Composition | | | | |
| Vinyl chloride, weight percent | 70 | 67 | — | — |
| Vinyl acetate, weight percent | 12 | 6 | — | — |
| Hydroxypropyl acrylate, weight percent | 8 | 7 | — | — |
| PEGMER D, weight percent | 10 | — | — | — |
| PEGMER F, weight percent | — | 20 | — | — |
| Test Results | | | | |
| Water spot test | | | | |
| 2-hour contact | No effect | No effect | Blush | No effect |
| 20-hour contact | No effect | No effect | — | Slight grain split |
| Bell adhesion test | No cracks | No cracks | Many cracks | Many cracks |
| Spray cleaner spot test, 2-hour contact | No effect | No effect | Slight attack | Dissolved |
| Shoe polish spot test, 2-hour contact | Trace stain | Trace stain | Slight stain | Severe stain |

The results demonstrate that the copolymers of this invention have properties superior to those of commercial products.

Example 23

This example describes the results obtained with an ambient-cured thermoset coating prepared by the acid-catalyzed crosslinking with an aminoplast. An aqueous waterborne copolymer dispersion was made in accordance with the processes described in the previous Examples from vinyl chloride, vinyl acetate, hydroxypropyl acrylate, and a PEGMER similar to PEGMER G in a weight ratio of 69/5/14/12. The resulting stable water dispersion contained 41% nonvolatiles by weight and had a viscosity of 101 centipoise ("cP"). The copolymer had an Inherent Viscosity of 0.27.

A mixer equipped with a Cowles-type mixing head was charged with 182.9 g of the above waterborne vinyl copolymer dispersion. A preformed mixture of the following components was slowly stirred into the copolymer dispersion: 25.5 g Urea Resin 1, 19.8 g isopropanol, and 18.8 g of ethylene glycol monobutyl ether. Immediately before the coating was applied to the oak wood substrate, 7.5 g of Catalyst 1 were added. This formulated, crosslinkable coating that had a viscosity of 85 centipoise ("cP") cP and 40 wt. % nonvolatiles was sprayed onto the oak wood substrate using an air atomized spray gun. The coating dried to a clear, hard, tough film with excellent adhesion and mar resistance. Film build and holdout were excellent, and the coating was substantially free of foam or bubbles. After ambient conditioning at room temperature, the coating developed good resistance to water and household chemicals. If desired, cure rate could be accelerated by heating.

Although the invention has been described with respect to specific aspects, those skilled in the art will recognize that other aspects are intended to be included within the scope of the claims which follow. For instance, poly(alkylene glycols) and acids other than those specifically described herein, may be used to make the macromonomers of the present invention. Also, additional monomers other than those specifically described herein, can be used to make the copolymers of the present invention. In addition, those skilled in the art will recognize that if desired the copolymers of the present invention may, instead of being dispersed in water, be recovered as a dry solid, powder, or solvent exchanged into a solvent commonly used in the coating art, such as, for example, methylethyl ketone, methylamyl ketone, cyclohexanone, tetrahydrofuran and the like.

We claim:

1. A process for producing an aqueous polymer dispersion comprising: (1) polymerizing monomers comprising (a) from about 50 to 90 weight percent of a vinyl halide, (b) a vinyl ester having from 2 to about 16 carbon atoms in the ester group, and (c) a macromonomer comprising the reaction product of (i) a poly(alkylene glycol) having a number average molecular weight of from about 2000 to 30,000 grams per gram mole and (ii) a carboxylic acid selected from the group consisting of maleic acid, fumaric acid, itaconic acid, trimellitic acid, and anhydrides and half esters thereof; said polymerization being conducted in the presence of a solvent for said monomers to form a copolymer of said monomers dissolved in said solvent; (2) contacting said copolymer dissolved in said solvent with an effective amount of water under shearing conditions to form an aqueous-organic liquid medium comprising a dispersion of said copolymer; and (3) removing at least a portion of said solvent from said aqueous-organic liquid medium to form an aqueous medium comprising a dispersion of said copolymer.

2. The process of claim 1 wherein the solvent is water miscible.

3. The process of claim 2 wherein the solvent is selected from the group consisting of acetone, methyl ethyl ketone, alcohols and mixtures thereof.

4. The process of claim 1 wherein the effective amount of water is from 0.25 to 1 times the volume of the solvent.

5. The process of claim 1 wherein the aqueous medium comprises less than about 1 weight percent of the solvent.

6. The process of claim 1 wherein the copolymer has an Inherent Viscosity of less than about 0.6.

* * * * *